United States Patent [19]

Warner

[11] Patent Number: 4,905,366

[45] Date of Patent: Mar. 6, 1990

[54] METHOD OF INSTALLING A POSITIVE BEARING HOUSING SEAL

[75] Inventor: Dale J. Warner, Palm Harbor, Fla.

[73] Assignee: Gits Bros. Mfg. Co., Tampa, Fla.

[21] Appl. No.: 357,257

[22] Filed: May 26, 1989

Related U.S. Application Data

[62] Division of Ser. No. 210,767, Jun. 23, 1988.

[51] Int. Cl.$^4$ ............................................. B23P 11/02
[52] U.S. Cl. ........................................ 29/451; 29/404; 29/425; 29/453; 29/468
[58] Field of Search ................... 29/148.4 S, 404, 425, 29/426.2, 450, 451, 453, 464, 468; 277/1, 9, 9.5, 37–43, 81 R, 93 R, 93 SD

[56] References Cited

U.S. PATENT DOCUMENTS

| | | | |
|---|---|---|---|
| 2,189,197 | 2/1940 | Cerny | 277/42 |
| 2,756,080 | 7/1956 | Andresen et al. | 277/40 |
| 3,467,395 | 9/1969 | Kan | 277/37 |
| 3,841,642 | 10/1974 | Kirker | 277/40 |
| 4,136,885 | 1/1979 | Uhrner | 277/42 X |
| 4,389,051 | 6/1983 | Mallaney | 277/41 |

Primary Examiner—Timothy V. Eley
Assistant Examiner—Andrew E. Rawlins
Attorney, Agent, or Firm—Hill, Van Santen, Steadman & Simpson

[57] ABSTRACT

A positive bearing housing seal is provided in which the stationary seal member, and possibly a reducer having the same peripheral shape of the stationary seal member, is employed for installing and aligning the stationary seal member and the rotary seal member with respect to the shaft. A flat surface of the stationary seal member is moved against a flat surface of the rotary seal member until the flat surface of the stationary seal member engages a machine wall or, if a reducer is used, a flat surface of the reducer. The shaft is then rotated to establish squareness. The stationary seal member is then removed from the shaft, reversed in the axial direction, and reinstalled such that a flexible extension thereof, including a peripheral bead, is inserted into engagement with the inner surface of an annular opening in the machine wall or an annular opening in the reducer.

2 Claims, 1 Drawing Sheet

METHOD OF INSTALLING A POSITIVE BEARING HOUSING SEAL

This is a division, of application Ser. No. 210,767, filed June 23, 1988.

BACKGROUND OF THE INVENTION

The present invention relates to a positive bearing housing seal which eliminates packing and O-rings between the seal and the machine housing and relates to a method for installing such a positive bearing housing seal.

SUMMARY OF THE INVENTION

The object of the invention is to provide a positive bearing housing seal which eliminates the necessity for packing O-rings between the seal and the machine housing and which also provides a method for installing such a bearing housing seal for squareness with respect to the rotary shaft of the machine.

The above object is achieved by providing a positive bearing housing seal which comprises six basic parts and, in one embodiment, a seventh basic part as a reducer, for sealing a bearing and providing squareness with respect to the machine and the shaft.

A major portion of the seal is employed in the method of assembling the seal for squareness with respect to the machine and the shaft as will be set forth hereinbelow.

BRIEF DESCRIPTION OF THE DRAWING

Other objects, features and advantages of the invention, its organization, construction and operation will be best understood from the following description taken in conjunction with the accompanying drawing on which.

DESCRIPTION OF THE PREFERRED EMBODIMENTS

Figure 1:
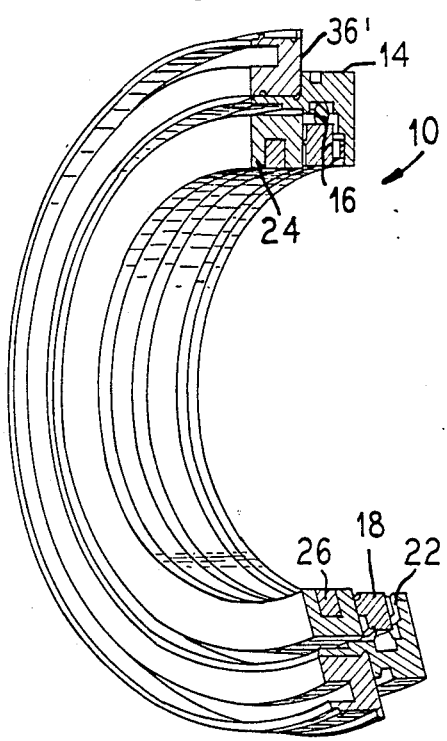
FIG. 1 is a perspective sectional view of a positive bearing housing seal constructed in accordance with the present invention.
Figure 2:
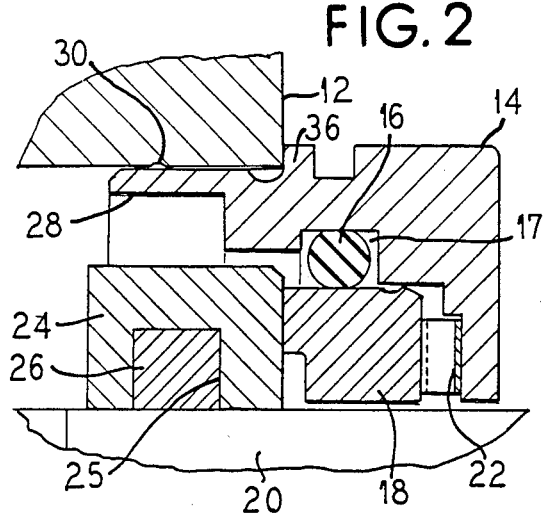
FIG. 2 is an enlarged sectional view taken at the upper end of the sectional view of FIG. 1.

Referring first to FIGS. 1 and 2, a positive bearing housing seal, constructed in accordance with the present invention, is generally illustrated at 10 as comprising a housing 14, which may be made of aluminum 6061, and including an internal groove 17 which houses an O-ring 16 which engages a stationary seal member 18. The O-ring may be Viton ®, while the stationary seal member may be constructed of Carbon P 658 RC material.

As will be appreciated below, the housing 14 is urged against the stationary seal member 18 by way of a wave spring 22 which may be a 17-7 PH/C stainless steel material.

The stationary seal member 18 is urged against a rotary seal member 24 mounted on the shaft 20 which includes an internal groove 25 which mounts a gasket 26, the gasket 26 also possibly being a Viton ® material.

The housing 14 includes a flexible portion 28 which carries a peripheral bead 30 for engaging the interior surface of the machine housing 12.

As also shown in FIG. 1, and in FIGS. 3-7, the apparatus may be provided with a reducer 36' which has the same peripheral shape as the housing 14, including the flexible portion with a bead 34 for mating with the machine housing 12.

In either embodiment of the physical structure of the invention, a line 38 is designated for alignment of the positive bearing housing seal with respect to the housing and the shaft.

It will be noted that the bearing housing 14 includes a flange 36 which abuts the machine housing 12.

As also seen in FIGS. 3-7, a reducer 32 may be employed which includes a flange 36' for abutting the machine housing 12. The reducer 32 includes the same peripheral design as the housing 14 including the flexible member with a similar bead 34.

Referring now to FIGS. 3-7, and bearing in mind that the structure is essentially the same with or without the reducer, the method and installation will be set forth.

Figure 3:
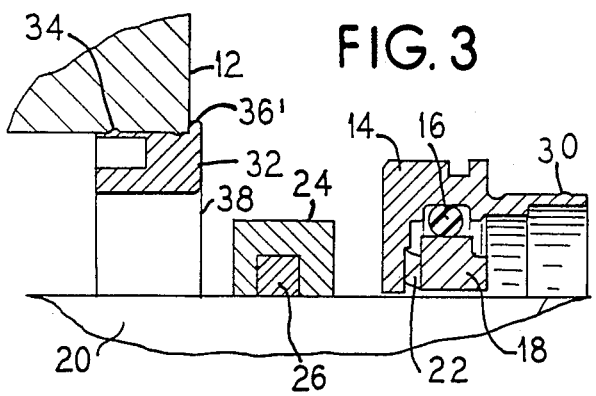
FIGS. 3-7 are sectional views similar to FIG. 2, but including an adapter, illustrating the method of installation of the positive bearing housing seal of the present invention.
Figure 4:
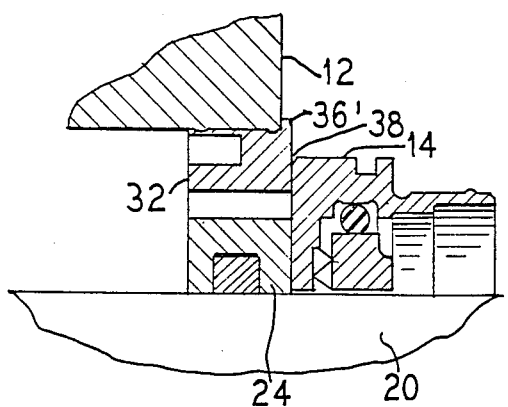

Referring to FIG. 3, and assuming a reducer 32 is employed with the flange 36' abutting the machine housing 12 and with the bead 34 engaging the inner surface, the rotary seal member 24, with the gasket 26, is placed on the shaft 20. The elements 14, 16, 18 and 22 are also placed on the shaft, but in the direction opposite to that illustrated in FIG. 2. These elements are then moved to the left in FIG. 3 until there is an alignment along the line 38 as shown in FIG. 4. The shaft is then rotated to obtain squareness, for example two revolutions.

Figure 5:
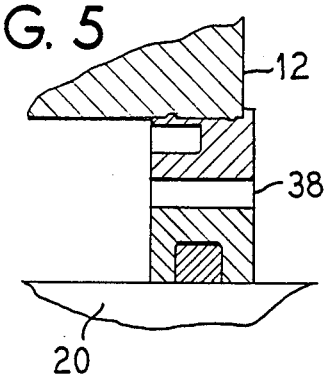

The elements 14, 16, 18 and 22 are then removed so that the structure of FIG. 5 is generated with the elements 32 and 24 being aligned along the line 38.

Figure 6:
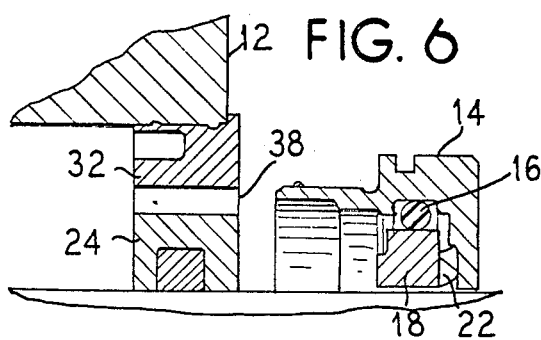

Referring now to FIG. 6, the elements 14, 16, 18 and 22 are reversed in direction and moved onto the shaft towards the elements 32 and 24 which, without the adapter 32, could be the elements 12 and 24.

Figure 7:
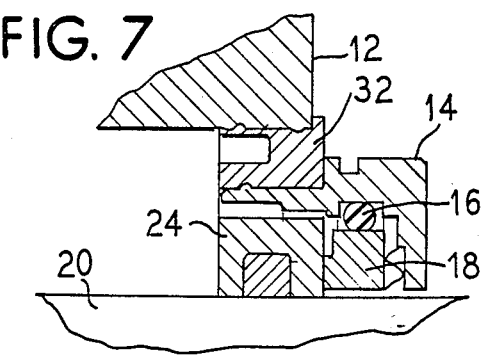

The elements 14, 16, 18 and 22 are then pressed against the elements 32 and 24 (or 12 and 24 as the case may be) so that the structure of FIG. 7 arises.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of installing a positive bearing housing seal with respect to a rotary shaft extending through an annular opening in a machine wall, said annular opening including an inner surface, comprising the steps of:

placing a rotary seal member onto the shaft;

placing a stationary seal member onto the shaft, said stationary seal member including a radial flat surface facing said rotary seal member in a first direction, a radial stop, and an annular flexible member extending in a direction opposite to the first direction and carrying a peripheral bead;

moving said stationary seal member against said rotary seal member until said stationary seal member engages said machine wall and said radial flat surface defines a plane engaging said rotary seal member;

turning the shaft to establish squareness of said rotary seal member with respect to said shaft while holding said stationary seal member thereagainst;

removing said stationary seal member, reversing the same and replacing the same on said shaft with said annular flexible member facing said machine wall; and moving said stationary seal member towards said rotary seal member until said radial stop engages said machine wall, said annular flexible member radially flexes in the annular opening of said machine wall and said peripheral bead engages the inner surface of said annular opening in said machine wall.

2. A method of installing a positive bearing housing seal with respect to a rotary shaft extending through an annular opening in a machine wall, comprising the steps of:

mounting a hollow reducer in said opening of said machine wall, said reducer including a radial flat surface and an inner surface;

placing a rotary seal member onto the shaft;

placing a stationary seal member onto the shaft, said stationary seal member including a radial flat surface facing said rotary seal member in a first direction, a radial stop, and an annular flexible member extending in a direction opposite to the first direction and carrying a peripheral bead;

moving said stationary seal member against said rotary seal member until said stationary seal member engages said radial flat surface of said reducer which defines a plane engaging said rotary seal member;

turning the shaft to establish squareness of said rotary seal member with respect to said shaft while holding said stationary seal member thereagainst;

removing said stationary seal member, reversing the same and replacing the same on said shaft with said annular flexible member facing said machine wall; and moving said stationary seal member towards said rotary seal member until said radial stop engages said reducer, said annular flexible member radially flexes in the annular opening of said reducer and said peripheral bead engages the inner surface of said annular opening in said reducer.

* * * * *